United States Patent [19]

Pokrandt

[11] 4,186,570
[45] Feb. 5, 1980

[54] SHEAR PIN COUPLING

[75] Inventor: Glenn C. Pokrandt, Menomonee Falls, Wis.

[73] Assignee: The Falk Corporation, Milwaukee, Wis.

[21] Appl. No.: 904,732

[22] Filed: May 11, 1978

[51] Int. Cl.² ............................ F16D 3/56; F16D 7/00
[52] U.S. Cl. ..................................... 64/28 R; 403/2; 403/369; 403/370; 403/371
[58] Field of Search ................... 64/28 R; 192/56 R; 403/2, 369, 370, 371; 285/4

[56] References Cited

U.S. PATENT DOCUMENTS

| | | | |
|---|---|---|---|
| 1,978,209 | 10/1934 | Kuhns | 64/28 R |
| 2,022,703 | 12/1935 | Bamer | 64/28 R |
| 2,969,661 | 1/1961 | Swanson | 64/28 R |
| 2,976,704 | 3/1961 | Klienschmidt | 64/28 R |
| 3,012,422 | 12/1961 | Zimmerer | 64/28 R |
| 3,033,542 | 5/1962 | Rosler | 64/28 R |
| 3,246,483 | 4/1966 | Schmitter | 64/28 R |
| 3,847,495 | 11/1974 | Peter | 403/370 |
| 3,855,818 | 12/1974 | Hochreuter | 64/28 R |
| 4,022,536 | 5/1977 | Piepho | 403/371 |
| 4,089,613 | 5/1978 | Babbitt | 403/371 |

*Primary Examiner*—Charles J. Myhre
*Assistant Examiner*—R. C. Turner
*Attorney, Agent, or Firm*—Quarles & Brady

[57] ABSTRACT

A shear pin assembly in a shaft coupling is disclosed in which an elongated, circular cylindrical shear pin having a central groove is held at its ends in split, tapered bushings received in tapered outer bushings press-fitted into bores in flanges of the two coupling halves. A loading bolt is threaded in each end of the shear pin and a head of the bolt bears against a loading plate which in turn is seated against the split inner bushing to force the inner bushing into place to rigidly grip the ends of the shear pin.

3 Claims, 3 Drawing Figures

SHEAR PIN COUPLING

BACKGROUND OF THE INVENTION

This invention relates to power transmission couplings, and particularly to couplings which utilize shear pins as a torque transmitting connection between coupling elements associated with the coupled shafts.

In certain applications of power transmission couplings connecting driving and driven shafts, such as in steel rolling mills and conveyors, the driven apparatus is likely to be jammed or stopped suddenly with a resulting overload which can damage the coupling and other elements in the power train. To prevent uncontrolled damage to the power train, the couplings are often provided with shear elements which form the weakest link in the drive train. These shear elements are designed to fail when a preselected overload is applied to the coupling so that sudden stoppage of the driven equipment or other causes of extreme shockloads will have the effect of breaking the shear element before failure of the coupling or damage to other elements in the drive train can occur.

The shear element is typically in the form of a replaceable pin. Examples of couplings employing shear pins are numerous in the prior art and include U.S. Pat. No. 1,978,209 issued Oct. 23, 1934, to Kuhns; U.S. Pat. No. 3,246,483 issued Apr. 19, 1966, to Schmitter; U.S. Pat. No. 3,855,818 issued Dec. 24, 1974, to Hochreuter; and British Patent No. 381,403 dated Oct. 6, 1932. The shear pins typically include a centrally located annular groove which defines the point of minimum cross section at which the pin should fail if it is subjected to pure shear loading.

In order to function as designed as to be subjected to shear loading only, the shear pin must fit without any clearance within the two coupling elements which it joins. Anything short of an interference fit will result in the application of bending stresses on the shear pin and this can lead to bending fatigue failures of the pins even when the overload has not been experienced.

However, it is very difficult to assemble a coupling with shear pins with an interference fit. As a result, the shear pins are typically assembled with some clearance and bending stresses necessarily result. Because of this, it has become accepted practice to replace the shear pins on a scheduled basis even though no failure has occurred but instead as a precaution against the possibility of fatigue failure. This results in unnecessary downtime for the equipment being driven.

Following failure of the shear pins it is often difficult to remove both ends from their respective bores in the couplings elements unless access can be gained from each end of the pins. Even if access is provided from each end, it is often difficult to replace an unbroken pin because the two coupling elements will typically have moved angularly a small amount thereby offsetting slightly the axes of the respective bores. To reduce such problem it has been common to utilize so-called stepped shear pins in which the diameter on one end of the pin is smaller than the diameter on the other end, and the diameters of the respective bores in which the pin ends fit are also of different sizes. This allows withdrawal of the smaller end through the larger diameter bore. Examples of the stepped shear pins are found in U.S. Pat. No. 3,855,818 and British Patent No. 381,403. The use of stepped shear pins increases the expense, however, because they are more difficult to machine than a pin of constant diameter, and they also require different sized bores or bushings therefore increasing the number of different parts required for the couplings.

By the present invention, I have provided a shear pin coupling which permits ease of assembly and replacement of the shear pins while at the same time providing a fit which approaches that of an interference fit thereby significantly reducing bending moments on the pin.

SUMMARY OF THE INVENTION

In accordance with my invention I provide a shear pin assembly for joining opposing coupling elements, which includes an elongated pin having circular cylindrical ends and a central annular groove, a split tapered bushing for each end of the pin, each split bushing having an inner surface adapted to engage the outer surface of one end of the pin and an outer surface tapered in a direction towards the annular groove of the pin, a pair of outer bushings each having a tapered central opening adapted to receive one of the split bushings, the outer bushings adapted to be fitted into bores in the coupling elements, and means for forcing each split tapered bushing into the respective outer bushing to cause the split bushing to rigidly engage the respective end of the shear pin.

My invention further resides in a shear pin coupling which utilizes a plurality of such shear pin assemblies for joining coupling halves.

It is a general object of the invention to provide a shear pin assembly which is easy to assemble and to replace.

It is another general object of the invention to provide a shear pin coupling in which the pin is rigidly fixed with a clearance approaching an interference fit within the two coupling elements which it joins.

It is a specific object of the invention to provide a shear pin coupling in which the ends of the pin are mounted in split bushings within coupling elements joined by the pin.

It is another specific object of the invention to provide a shear pin coupling which will fail in shear as a result of overloads on the power train in which the coupling is connected and which will not fail due to bending fatigue.

It is another specific object of the invention to provide a shear pin coupling in which the pin can be of constant diameter, except for a central annular groove.

It is still another specific object of the invention to provide a shear pin coupling in which the shear pin and its bushings are symmetrical about the gap between the coupling halves to thereby minimize the number of parts required.

The foregoing and other objects and advantages of the invention will appear from the detailed description which follows. In the description reference is made to the accompanying drawings which illustrate a preferred embodiment of the invention.

DETAILED DESCRIPTION OF THE PREFERRED EMBODIMENT

Figure 1:
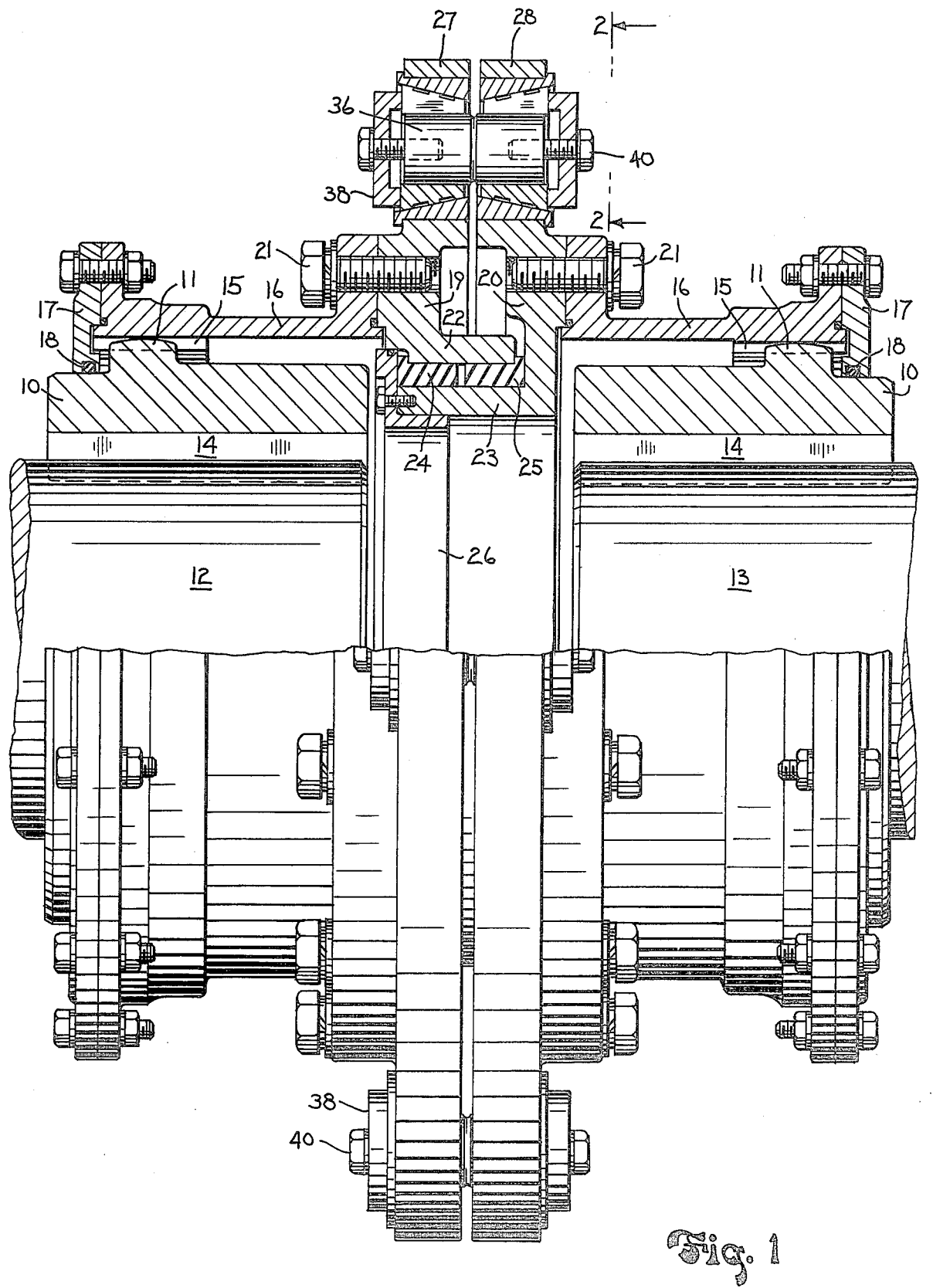
FIG. 1 is a view in elevation and partially in section of a coupling in accordance with the teachings of this invention.
Figure 2:
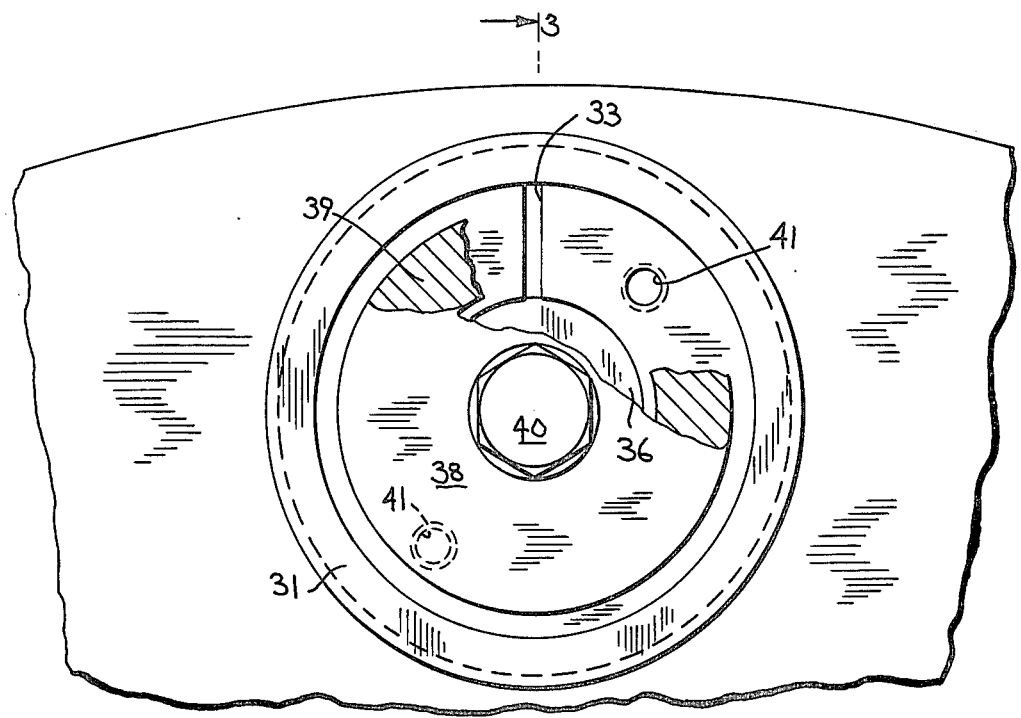
FIG. 2 is an end view in elevation, with a portion broken away for illustration, of the shear pin assembly of FIG. 1 to an enlarged scale.
Figure 3:
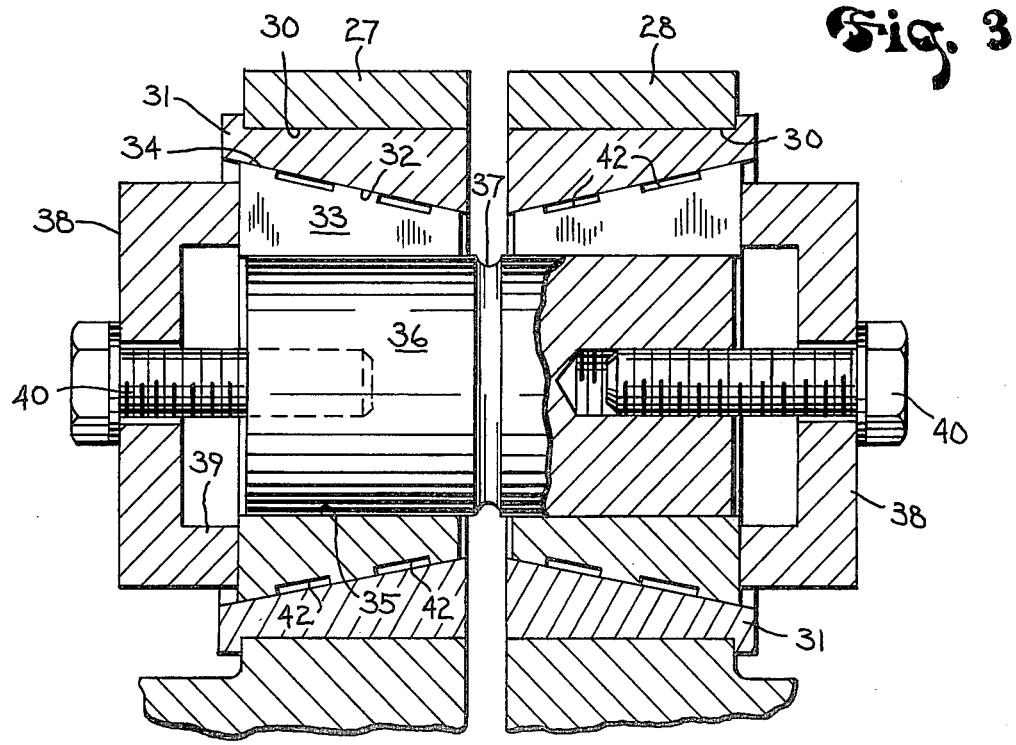
FIG. 3 is a view in vertical section of the shear pin assembly taken in the plane of the line 3—3 of FIG. 2.

The coupling is shown incorporated in a gear type coupling although the invention is usable in other forms of flexible shaft coupling, including the type which employs a serpentine grid such as shown in the Schmitter U.S. Pat. No. 2,181,537. The coupling includes a pair of identical hubs 10 which include a series of external, crowned gear teeth 11. The hubs 10 are adapted to be attached to respective driving and driven shafts 12 and 13 by suitable keys 14. The series of external gear teeth 11 mate with corresponding series of internal gear teeth 15 formed on the interior of identical cylindrical sleeve members 16. One end of the sleeve members 16 mounts an annular plate 17 which holds an O-ring seal 18 against an outer diameter of the hubs 10. The other end of each of the sleeve members 16 is connected to a respective one of two coupling members 19 and 20 by means of bolts 21.

One coupling member 19 includes an axially projecting outer cylindrical portion 22 and the other coupling member 20 includes an axially extending radially inner cylindrical portion 23 which is spaced from the cylindrical portion 22 of the flange member 19. A pair of bushings 24 and 25 are press fitted into the outer cylindrical portion 22 and provide a journaled support upon portion 23 for the assembly of sleeve member, and coupling member attached to each of the two shafts. A keeper member 26 is bolted to the free end of the radially inner cylindrical member 23 and provides axial restraint for the two coupling halves upon the breaking of the shear elements to be described.

As thus far described the coupling does not differ from that which is known. The present invention relates to an improved assembly for joining together the radially extending flanges 27 and 28 of the two coupling members 19 and 20 which are spaced apart and confront each other.

The flanges 27 and 28 are each provided with a series of angularly spaced bores 30 which can be aligned with the corresponding bore 30 of the opposite flange. Typically, there will be several bores 30 in each flange and in the preferred embodiment the number is four. An outer tapered bushing 31 is press fitted in each of the bores 30 and the outer bushing 31 has the surface 32 of its central opening formed as a section of a circular cone tapering in a direction towards the gap between the flanges. An inner split tapered bushing 33 is received within the tapered inner surface 32 of the outer bushing 31 and it has an outer surface 34 formed as a section of a cone which is complementary to the inner surface 32 of the outer bushing 31. The inner bushing 33 has a central bore 35 which is adapted to receive and engage one end of an elongated circular cylindrical shear pin 36. The shear pin 36 is formed with a central annular groove 37. A circular loading plate 38 has a rim 39 which is adapted to seat against the wider, outer end of the inner split bushing 33. The loading plate 38 has a central opening which receives a loading bolt 40 which is threaded into an adjacent end of the shear pin 36.

It will be appreciated that in assembling the coupling, the shear pin assemblies can be loosely assembled and then the respective loading bolts 40 can be tightened to force the split inner bushings 33 towards the gap between the flanges 27 and 28 with the result that the central bores 35 of the split bushings 33 will tightly grasp the outer surfaces of the ends of the shear pins 36. Accordingly, rather than relying upon closely machined tolerances, the split bushings can be forced to seat about the body of the shear pins 36 to thereby hold the shear pins 36 rigid within the flanges 27 and 28 to a degree approaching an interference fit.

During operation of the coupling, all torque transmitted from the driving shaft 12 to the driven shaft 13 passes through the shear pins 36. Because the shear pins 36 are rigidly fixed, they will be subjected almost totally to shear forces rather than to bending moments. As a result, failure of the shear pin should occur only when the designed overload condition is present, and premature failure due to bending moment fatigue is prevented.

When a shear pin does fail due to an overload condition, the broken ends of the pin are easily removed by loosening the bolts 40 and removing the load plates 38. The inner split bushing 33 can then be pulled out by the insertion of bolts in threaded holes 41 provided in the wide end of the split bushings. The removal and replacement of unbroken pins is similarly easily accomplished because of the large opening through which the shear pins 36 can be removed once the split bushings 33 have been backed off.

The outer tapered surface 34 of the split bushing 33 is advantageously provided with several annular recesses 42. Such recesses 42 aid in controlling the required axial force necessary to insert the split bushing into the outer bushing 31. This is accomplished by reducing the surface area of contact between the inner and outer bushings and thereby reducing the overall force required to insert and tighten the split bushings.

Preferably, the outer bushing 31 is formed with a hardness which is greater than that of the inner split bushing 33, and the split bushing 33 has a greater hardness than that of the shear pin 36. This reduces the tendency of one part becoming embedded into another and aids in removal of the assembly. The axial lengths in contact with respect to the inner and outer bushings and shear pins are similarly selected to reduce the tendency of embedding and in each instance the harder material extends axially beyond the softer material. As an example, the shear pins may be formed of a steel having a hardness of less than 160 Brinell, the split bushing may be of steel having a hardness of 245-285 Brinell, and the outer bushing may be of a steel having a hardness of 340 Brinell.

The angle of taper between the inner and outer bushings is preferably selected to avoid tensile stress within the shear pin assembly. An angle of between 2°-5° with respect to the axis of the shear pin 36 (and thus the shear pin assembly) will provide a self-locking angle in which the axial component of force across the engaging surfaces 32 and 34 of the bushings 31 and 33 will be slight.

Although the invention has been described as incorporated within a coupling, a shear pin assembly in accordance with the invention may be used to join other elements of a drive train. For example, the shear pin assemblies could be used to join a chain sprocket to a flange on a shaft within a drive train and may in fact be used to join any two-flanged elements.

The shear pin assembly is symmetrical about the groove 37 thereby reducing the number of different parts required. Because a shear pin of constant diameter can be used, the shear pins are easier to manufacture and removal is possible from either direction, as compared with the stepped shear pins of the prior art.

I claim:

1. A shear pin flexible coupling for connecting two shafts, comprising:

two coupling halves each connectable to one of said shafts and each including a radially extending annular flange spaced from and confronting the flange of the other half, said flanges having spaced bores which can be aligned with the like bores of the opposite flange;

an outer bushing fitted into each bore, each outer bushing having a central opening the surfaces of which tapers inwardly toward the gap between the flanges;

an inner bushing having a single split and being received in each outer bushing, said inner bushing having a central opening and an outer surface which is tapered to complement the taper of the outer bushing;

elongated shear pins extending across the gap and having two circular cylindrical ends of like diameter disposed within the tapered inner bushings, and a central annular groove disposed in said gap; and means for forcing the inner bushings in the direction of the gap to rigidly grasp the shear pins with an interference fit, said forcing means each comprising a circular loading plate having a rim which bears against the outer end of the split bushing and having a central bore, and a headed bolt having its shank extending through the central bore and threaded received into one end of the shear pin.

2. A shear pin flexible coupling for connecting two shafts, comprising:

two coupling halves each connectable to one of said shafts and each including a radially extending annular flange spaced from and confronting the flange of the other half, said flanges having spaced bores which can be aligned with the like bores of the opposite flange;

an outer bushing fitted into each bore, each outer bushing having a central opening the surfaces of which taper inwardly toward the gap between the flanges;

an inner split bushing received in each outer bushing, and having a central opening and an outer surface which is tapered to complement the taper of the outer bushing, the complementary tapered surfaces of said inner and outer bushings being formed as portions of a circular cone, the outer surface of each inner bushing being provided with recesses which reduce the area of contact between the inner and outer bushings;

shear pins extending across the gap and having their ends disposed within the tapered inner bushings, each shear pin being formed as an elongated circular cylinder of uniform diameter and with an annular groove intermediate its ends, said groove being disposed in said gap; and means for forcing the inner bushings in the direction of the gap to rigidly grasp the shear pins.

3. A shear pin flexible coupling for connecting two shafts, comprising:

two coupling halves each connectable to one of said shafts and each including a radially extending annular flange spaced from and confronting the flange of the other half, said flanges having spaced bores which can be aligned with the like bores of the opposite flange;

an outer bushing fitted into each bore, each outer bushing having a central opening the surfaces of which taper inwardly toward the gap between the flanges;

an inner split bushing received in each outer bushing, and having a central opening and an outer surface which is tapered to complement the taper of the outer bushing;

shear pins extending across the gap and having their ends disposed within the tapered inner bushings; and means for forcing the inner bushings in the direction of the gap to rigidly grasp the shear pins, the hardness of the outer bushings being greater than that of the inner bushings, and the hardness of the inner bushings being greater than that of the shear pins.

* * * * *